United States Patent [19]
Kroner et al.

[11] Patent Number: 5,830,985
[45] Date of Patent: Nov. 3, 1998

[54] PREPARATION OF POLYASPARTIC ACID

[75] Inventors: Matthias Kroner, Eisenberg; Gunnar Schornick, Neuleiningen; Hans-Jacob Feindt, Ludwigshafen; Thomas Meyer, Römerberg; Alfons Ludwig, Höxter; Udo Metzmann, Obrigheim, all of Germany

[73] Assignee: BASF Aktiengesellschaft, Ludwigshafen, Germany

[21] Appl. No.: 776,706

[22] PCT Filed: Jul. 28, 1995

[86] PCT No.: PCT/EP95/03003

§ 371 Date: Feb. 12, 1997

§ 102(e) Date: Feb. 12, 1997

[87] PCT Pub. No.: WO96/05241

PCT Pub. Date: Feb. 22, 1996

[30] Foreign Application Priority Data

Aug. 12, 1994 [DE] Germany .......................... 44 28 639.2

[51] Int. Cl.$^6$ ...................................................... C08G 69/10
[52] U.S. Cl. .......................... 528/328; 528/363; 530/333; 530/339; 530/340
[58] Field of Search ..................................... 528/328, 363; 530/333, 339, 340

[56] References Cited

U.S. PATENT DOCUMENTS

| | | | |
|---|---|---|---|
| 5,142,062 | 8/1992 | Knebel et al. | 548/545 |
| 5,219,986 | 6/1993 | Cassata . | |
| 5,221,733 | 6/1993 | Koskan et al. | 530/333 |

FOREIGN PATENT DOCUMENTS

| | | |
|---|---|---|
| 0 646 615 A2 | 5/1995 | European Pat. Off. . |
| 0659875 A2 | 6/1995 | European Pat. Off. . |
| 2 246 786 | 2/1992 | United Kingdom . |
| WO 92/14753 | 9/1992 | WIPO . |

OTHER PUBLICATIONS

Journal of Medicinal Chemistry, vol. 16, No.8 (1973) Paolo Neri, et al., Synthesis of α,β–Poly[(2–hydroxyethyl)–D-L–aspartamide], a New Plasma Expander.

*Primary Examiner*—Duc Truong
*Attorney, Agent, or Firm*—Oblon, Spivak, McClelland, Maier & Neustadt, P.C.

[57] ABSTRACT

A process for preparing polyaspartic acid by polycondensation of fine-particle aspartic acid at temperatures above 150° C. in the presence of acidic catalysts, wherein first contact between the acidic catalysts and the fine-particle aspartic acid takes place in the reaction zone where the polycondensation takes place.

18 Claims, No Drawings

PREPARATION OF POLYASPARTIC ACID

BACKGROUND OF THE INVENTION

1. Field of the Invention

The present invention relates to a process for preparing polyaspartic acid by polycondensation of fine-particle aspartic acid at temperatures above 150 °C. in the presence of acids as catalysts.

2. Discussion of the Background

The use of phosphoric acid as catalyst in the polycondensation of aspartic acid is known, compare Journal of Medicinal Chemistry, 16 (1973) 893 and DE-A-4 023 463. The polycondensation temperature is at least 120° C. and, in most cases, is in the range from 140° to 250°, preferably 160° to 240° C. U.S. Pat. No. 5,219,986 discloses a process for the thermal polycondensation of aspartic acid in a fluidized bed under reduced pressure.

U.S. Pat. No. 5,221,733 discloses a process for preparing polysuccinimide in which powdered L-aspartic acid is first rapidly heated to about 188° C. in a rotary evaporator, and then the temperature of the mixture is rapidly increased to at least 227 °C., and condensation is continued at this temperature until the conversion is at least 80%. Salts of polyaspartic acid are prepared by hydrolyzing the resulting poly succinimide with bases.

One problem in the polycondensation of fine-particle aspartic acid in the presence of acids such as phosphoric acid is that the phosphoric acid acting as catalyst must be distributed as uniformly as possible on the aspartic acid crystals before the polycondensation. If phosphoric acid is used in amounts of about 5–20% of the weight of aspartic acid, sticky phases are produced on the aspartic acid crystals during the polycondensation. This leads to agglomeration of aspartic acid crystals so that the polymerizing mixture becomes virtually impossible to stir.

SUMMARY OF THE INVENTION

It is an object of the present invention to provide a process for preparing fine-particle polyaspartic acid by polycondensation of aspartic acid powder in the presence of acidic catalysts in which virtually no, or slight at the most, agglomeration of polymer particles occurs.

We have found that this object is achieved by a process for preparing polyaspartic acid by polycondensation of fine-particle aspartic acid having an average particle diameter of 5 $\mu$m–5 mm at temperatures above 150° C. in the presence of acidic catalysts when the first contact between the acidic catalysts and the fine-particle aspartic acid takes place in the reaction zone where the polycondensation takes place.

A DETAILED DESCRIPTION OF THE PREFERRED EMBODIMENT

It is possible to use as aspartic acid L-, DL- or D-aspartic acid besides mixtures of said aspartic acids. Aspartic acid can be prepared, for example, by thermal addition of ammonia onto maleic acid, by enzymatically catalyzed addition of ammonia onto fumaric acid or by fermentation of glucose and ammonium salts with micro-organisms. The size of the crystals and the method of preparation of aspartic acid have no effect on the polycondensation. The fine-particle aspartic acid used for the polycondensation can have average particle diameters of, for example, 5 $\mu$m–5 mm, preferably 50 $\mu$m–400 $\mu$m.

The polycondensation of the fine-particle aspartic acid takes place at temperatures above 150° C., preferably at 160°–200° C.

Suitable acidic catalysts are inorganic and organic acids and compounds with an acidic reaction. Examples of acids are:

| | | |
|---|---|---|
| Benzenesulfonic acid | pKa = | 0.70 |
| Naphthalenesulfonic acid | pKa = | 0.57 |
| Ortho-phosphoric acid | pKa1 = | 2.12 |
| Pyrophosphoric acid | pKa1 = | 0.85 |
| Pyrophosphoric acid | pKa2 = | 1.49 |
| Phosphorous acid | pKa1 = | 2.00 |
| Sulfuric acid | pKa2 = | 1.92 |
| Sulfuric acid | pKa1 | below 0.7 |
| Hydrochloric acid | pKa | below 0.7 |
| Sulfurous acid | pKa1 = | 1.81 |
| Dichloroacetic acid | pKa1 = | 1.48 |
| Bromoacetic acid | pKa1 = | 2.69 |
| Chloroacetic acid | pKa1 = | 2.85 |
| Chloropropionic acid | pKa = | 2.83 |
| Cyanoacetic acid | pKa = | 2.45 |
| Dichloroacetic acid | pKa = | 1.48 |
| Dihydroxymaleic acid | pKa1 = | 1.92 |
| Dihydroxytartaric acid | pKa1 = | 1.92 |
| Maleic acid | pKa1 = | 1.83 |
| Oxalic acid | pKa1 = | 1.23 |
| Trihydroxybenzoic acid | pKa1 = | 1.68 |

The catalysts preferably used are phosphoric acid, phosphorous acid, hypophosphorous acid and partially neutralized sulfuric acid, such as ammonium bisulfate, sodium bisulfate and potassium bisulfate, mixtures of sodium and potassium bisulfates, low-melting mixtures of ammonium, sodium and potassium bisulfates, trimethylammonium bisulfate, triethylammonium bisulfate and mixtures of said bisulfates, and sulfuric acid and hydrochloric acid. As is evident from the above list of acids, the pKa values of the acids are, with the exception of sulfuric acid and hydrochloric acid, in the range from 0.7 to 3.0. The acidic catalysts are preferably used in an amount such that the ratio of aspartic acid to acidic catalysts is from 1:0.02 to 1:0.25 by weight. Whereas complete polycondensation of aspartic acid in the absence of acidic catalysts at about 200° C. takes about 50 hours, complete conversion is obtained after a period of from 5 minutes to 5 hours in the polycondensation of aspartic acid in the presence of acidic catalysts.

It is also preferable to use gaseous hydrogen chloride alone or mixed with nitrogen. It is additionally possible to use aqueous solutions of hydrochloric acid as catalyst. Hydrochloric acid has the advantage that only small residual contents are present in the polycondensate after the polycondensation. An especially catalytically active acid is gaseous hydrogen chloride. The pKa of hydrochloric acid is below 0.7.

In a preferred embodiment, a fluidized bed of aspartic acid crystals at 160°–200° C. is maintained with an inert gas stream containing 0.01–20% by volume hydrogen chloride. The fluidizing gas stream can be continuously circulated after removal of the water eliminated in the polycondensation.

On starting up the fluidized bed, the aspartic acid is preheated to 160°–200° C. in the inert gas stream and, when the temperature at which the polycondensation of aspartic acid takes place at an adequate rate is reached, hydrogen chloride is metered into the fluidizing gas.

In the process according to the invention, fine-particle aspartic acid is condensed to fine-particle poly succinimide which is then used to prepare polyaspartic acid by hydrolysis or the salts of polyaspartic acid by neutralization with bases. The advantage of the process according to the invention compared with known processes for the polycondensation of aspartic acid in the presence of acidic catalysts is that in the process according to the invention the formation of sticky phases on the aspartic acid crystals is avoided so that there is no caking of the fine-particle aspartic acid during the polycondensation. The process according to the invention can be carried out batchwise or continuously. The polycondensation of the powdered aspartic acid can take place in a fluidized bed or in an agitated fixed bed. Suitable equipment for the process according to the invention is all apparatus which is normally considered for solids mixing and which permits heat input, for example mixers and kneaders equipped with nozzles and having mixing arms and kneading hooks of various shapes, and rotary tube furnaces and fluidized bed reactors. For the continuous preparation of poly succinimide it is possible, for example, to carry out the polycondensation of aspartic acid in a fluidizing channel. The fluidizing channel may have various zones, eg. a zone in which aspartic acid is brought into contact with the acidic catalyst, eg. by spraying, and another zone in which the polycondensation takes place, where appropriate at a higher temperature than the contacting with the acids.

In a preferred embodiment of the process according to the invention, powdered aspartic acid is heated in a fluidized bed to at least 150°, preferably 160°–200° C. and brought into contact with an acidic catalyst. This can take place by applying the acidic catalyst, where appropriate dissolved in a solvent, to the powder bed by, for example, dropwise addition, metering in one or more thin jets, or spraying or injecting onto the surface or directly into the fluidized bed. This results in the fine-particle aspartic acid being impregnated with the acidic catalysts. The polycondensation is initiated at the impregnated sites in the aspartic acid, and the water produced in the condensation is removed from the system. A solution of polyaspartimide in the acids used as catalyst is produced on the surface of the aspartic acid crystals because the acids are good solvents both for aspartic acid and for polyaspartimide. Because of the concentration gradient between the surface and the interior of the crystals of aspartic acid, the acid diffuses into the interior of the crystals and there initiates the polycondensation. This leads to depletion of acidic catalyst from the surface of the crystals so that very concentrated solutions of poly succinimide in the catalyst are present there. However, such highly concentrated solutions are no longer sticky so that the individual aspartic acid particles do not cake together. The acidic catalysts which have diffused from the surface of the aspartic acid crystals into the interior are replaced during the polycondensation by newly applied acidic catalysts. The acidic catalysts are preferably sprayed onto the surface of the fine-particle aspartic acid in such a way that no sticky solutions are produced thereon. For practical implementation of the process, this means that the maximum amount of the acidic substances acting as catalyst which is applied to the surface of the fine-particle aspartic acid is such that the amount of added acid corresponds to the amount of acid which diffuses into the fine-particle aspartic acid. This prevents adhesion of the particles so that the reaction mixture is always in the form of a free-flowing, stirrable and non-sticky powder throughout the polycondensation reaction.

An embodiment of particular industrial simplicity of the process according to the invention comprises heating fine-particle aspartic acid in a paddle dryer or in a fluidized bed to at least 150° C., and spraying on the required amount of catalytically active acids during the polycondensation. The polycondensation takes, for example, from 1 minute to 10 hours. In the case of polycondensation in a fluidized bed, the reaction may, where appropriate, also be stirred. Inert gases such as nitrogen or carbon dioxide can be used as fluidizing gas, but air, gaseous hydrogen chloride, mixtures of air or nitrogen with gaseous hydrogen chloride or gaseous sulfur dioxide can be used as fluidizing gas. The fluidizing gas can be circulated, and the content of steam which is formed in the polycondensation may rise to saturation so that the circulating gas may also be composed of pure steam.

The content of hydrogen chloride in the fluidizing gas can be, for example, 0.01–20% by volume.

In order to avoid energy losses in the interior of the reactor, the acidic catalysts can be heated to a temperature at which the polycondensation of aspartic acid is carried out. For example, a 10–80% strength phosphoric acid can be heated in a pressure-tight container to at least 150° C., and the aqueous acid can be sprayed into the reactor through a nozzle. In this way the energy required to vaporize the diluting water is no longer removed from the polycondensation zone.

The polycondensates result in fine-particle form. The particle diameter of the polycondensates obtainable by the process according to the invention is, for example, 10 $\mu$m–10 mm, preferably 30 $\mu$m–5 mm. If minor amounts of agglomerates are produced, they can easily be milled to the desired particle size. The polycondensates are generally composed of polyaspartic acids, polysuccinimides or mixtures of the two said polycondensates. From them it is possible to prepare by hydrolysis with bases the corresponding salts of polyaspartic acid. Suitable as base are alkali metal and alkaline earth metal bases, and ammonia and amines. Thus, for example, addition of sodium hydroxide solution or sodium carbonate to an aqueous suspension of powdered polysuccinimides results in aqueous solutions of sodium poly aspartate. The molecular weights $M_w$ of the polyaspartic acids are from 800 to 100,000. The polycondensates prepared by the process according to the invention contain less than 15, preferably less than 10, mol % of non-biodegradable polymeric impurities.

The polyaspartic acids and their salts are used, for example, in phosphate-free or reduced phosphate detergents and cleaners which contain at least one surfactant and other conventional ingredients where appropriate, The phosphorus content of reduced phosphate detergents does not exceed 25% by weight calculated as Na triphosphate. The detergents preferably contain completely biodegradable surfactants. The amount of polyaspartic acid or its salts in the detergents and cleaners is, for example, 1–10% by weight.

The detergents can be in powder form of else in liquid formulations. The composition of the detergent and cleaner formulations may vary widely. Detergent and cleaner formulations normally contain 2–50% by weight of surfactants, with or without builders. These data apply both to liquid and to powder detergents. Detergent and cleaner formulations customary in Europe, the USA and Japan are tabulated, for example, in Chemical and Engn. News, 67 (1989) 35. Further details of the composition of detergents and cleaners may be found in Ullmanns Encyklopädie der technischen Chemie, Verlag Chemie, Weinheim 1983, 4th edition, pages 63–160. The detergents may also contain a bleach, eg. sodium perborate, which may, if used, be present in amounts of up to 30% by weight in a detergent formulation. The detergents and cleaners may contain further conventional additives, eg. complexing agents, opacifiers, optical brighteners, enzymes, perfume oils, colortransfer inhibitors, antiredeposition agents and/or bleach activators.

The percentage data in the examples mean percentages by weight.

EXAMPLE 1

2 kg of aspartic acid (particle size 0.1–1 mm) are introduced into a fluidized bed reactor equipped with a stirrer and are kept fluidized with stirring and passing through 2,000 l of nitrogen per hour. The fluidizing gas is at 185° C. The fluidized bed reactor has a diameter of 10 cm and a height of 80 cm. The height of the fluidized aspartic acid crystals is 30 cm. The wall and base of the reactor are heated so that the aspartic acid crystals are at 180°–185° C. As soon as the fluidized material has reached this temperature, 1 l of 10% strength aqueous phosphoric acid at 90° C. is sprayed over the course of 4 hours at the same time as 1,600 l of nitrogen per hour to atomize the aqueous phosphoric acid through an atomizing nozzle arranged on the side into the fluidized material. The vaporized water is removed at the head of the reactor together with the fluidizing gas. 4 ceramic filter candles are located at the head of the reactor and are periodically cleaned by a gas jet. After addition of acid is complete, the fluidized material shows only slight agglomeration to a particle size of 3 mm and can be satisfactorily fluidized. The average size of the fluidized material is 100 $\mu$m–1 mm. There is no caking on the reactor wall. After the addition of acid is complete, the reaction mixture is fluidized at 180°–185° C. for a further 2 hours and subsequently cooled. The polycondensate is then washed with 4 l of water, dried and converted into the sodium salt of polyaspartic acid by addition of 25% strength aqueous sodium hydroxide solution. The molecular weight $M_w$ is 10,000. The molecular weight was determined by gel permeation chromatography with polyacrylic acid standard.

EXAMPLE 2

1 kg of aspartic acid (particle size 0.1 mm) is introduced into the apparatus described in Example 1 and heated to 185° C. and, at this temperature, sprayed with 500 ml of a 20% strength aqueous phosphoric acid solution over the course of 2 hours. After the addition of phosphoric acid is complete, the reaction mixture is fluidized at 185° C. for a further 2 hours and subsequently cooled. Poly succinimide with an average particle size of 0.1–1 mm is obtained. The poly succinimide is washed with water to remove phosphoric acid and subsequently converted into the sodium salt of polyaspartic acid by addition of 25% strength aqueous sodium hydroxide solution. The molecular weight $M_w$ of the polyaspartic acid is 15,000.

EXAMPLE 3

1 kg of aspartic acid is introduced into the apparatus described in Example 1 and heated to 180° C. When this temperature is reached, the amount of fluidizing gas is increased to 3,000 liter per hour and, at the same time, 30 liter per hour of a dry hydrogen chloride stream from a gas cylinder is mixed with the fluidizing gas before entry into the reactor. After 1 hour, the amount of hydrogen chloride is increased to 80 liter per hour. The polycondensation is continued for a further hour, and the input of hydrogen chloride is stopped. After a further 10 minutes, the polycondensate is emptied out of the reactor. The polycondensate is used without further purification for the hydrolysis with sodium hydroxide solution. A polyaspartic acid of molecular weight $M_w$ 7,000 is obtained.

EXAMPLE 4

2 kg of aspartic acid (particle diameter 0.1–1 mm) are introduced into a paddle dryer with wall-sweeping concave paddles and a reactor volume of 5 l and, while stirring at 50–100 rpm, heated to 190° C. The reactor wall temperature is 220° C. The reactor is operated under a reduced pressure of 60–70 mbar.

As soon as the aspartic acid crystals have reached the reaction temperature of 190° C., 267 g of a 75% strength aqueous phosphoric acid solution are sprayed in through a nozzle over a period of 30 min. The product is uniformly impregnated and contains only few agglomerates.

The vaporized water is removed through a vapor outlet. The reaction mixture is at from 180° to 200° C. during addition of the acid. After the addition of acid is complete, polycondensation is continued for 2 hours, with the temperature of the reaction mixture rising to 210° C. towards the end of the reaction.

A very fine, free-flowing product is obtained. No caking is observable on the inner wall of the reactor. Hydrolysis with sodium hydroxide solution results in a polyaspartic acid with molecular weight $M_w$ 9,000.

We claim:

1. A process for preparing polyaspartic acid, which comprises polycondensing fine-particle aspartic acid having an average particle diameter of from about 5 $\mu$m to 5 mm at temperatures of about 150° C. in the presence of one or more acidic catalysts in a fluidized bed or an agitated fixed bed, wherein first contact between the one or more acidic catalysts and the fine-particle aspartic acid occurs in the reaction zone where the polycondensation takes place, and wherein said produced polyaspartic acid has a particle size of from about 10 $\mu$m to 10 mm.

2. The process as claimed in claim 1, wherein fine-particle aspartic acid which has been heated to 160°–200° C. is brought into contact with catalyst in the ratio of aspartic acid to catalyst of from 1:0.02 to 1:0.25 by weight.

3. The process as claimed in claim 1, wherein the acids acting as catalyst are sprayed onto fine-particle aspartic acid.

4. The process as claimed in claim 3, wherein the acidic catalysts are sprayed onto the surface of the fine-particle aspartic acid in amounts such that no sticky solutions are then produced.

5. The process as claimed in claim 1, wherein the maximum amount of acidic catalysts applied to the surface of the fine-particle aspartic acid is such that the amount of added acidic catalysts corresponds to the amount of acidic catalysts which diffuses into the fine-particle aspartic acid.

6. The process as claimed in claim 1, wherein gaseous hydrogen chloride is used as acidic catalyst.

7. The process as claimed in claim 1, wherein phosphoric acid, phosphorous acid, hypophosphorous acid, ammonium bisulfate, sodium bisulfate, potassium bisulfate, mixtures of sodium and potassium bisulfates, mixtures of ammonium, sodium and potassium bisulfates, trimethylammonium bisulfate, triethylammonium bisulfate and mixtures of said bisulfates, and sulfuric acid, are used as catalyst.

8. The process as claimed in claim 1, wherein powdered aspartic acid is heated in a fluidized bed to at least about 150° C.

9. The process as claimed in claim 8, wherein said powdered aspartic acid is heated in said fluidized bed to a temperature of from about 160° to 200° C.

10. The process as claimed in claim 1, wherein said polyaspartic acid formed has a particle diameter of from about 10 $\mu$m to 10 mm.

11. The process as claimed in claim 10, wherein said polyaspartic acid has a particle diameter of from about 30 $\mu$m to 5 mm.

12. The process as claimed in claim 1, wherein said polyaspartic acid has a molecular weight of from about 800 to 100,000.

13. The process as claimed in claim 1, wherein said fine-particle aspartic acid has an average particle diameter of from 50 µm to 400 µm.

14. The process as claimed in claim 6, wherein said gaseous hydrogen chloride is used alone or mixed with inert gas.

15. The process as claimed in claim 14, where a mixture of gaseous hydrogen chloride and inert gas is used containing from 0.01 to 20% by volume of hydrogen chloride.

16. The process as claimed in claim 1, which is effected in a fluidized bed using a fluidizing gas comprising nitrogen, carbon dioxide, air, gaseous hydrogen chloride, a mixture of air or nitrogen with gaseous hydrogen chloride or gaseous sulfur dioxide.

17. The process as claimed in claim 1, where said polyaspartic acid contains less than 15 mol % of non-biodegradable polymeric impurities.

18. The process as claimed in claim 17, where said polyaspartic acid contains less than 10 mol % of non-biodegradable polymeric impurities.

* * * * *